UNITED STATES PATENT OFFICE.

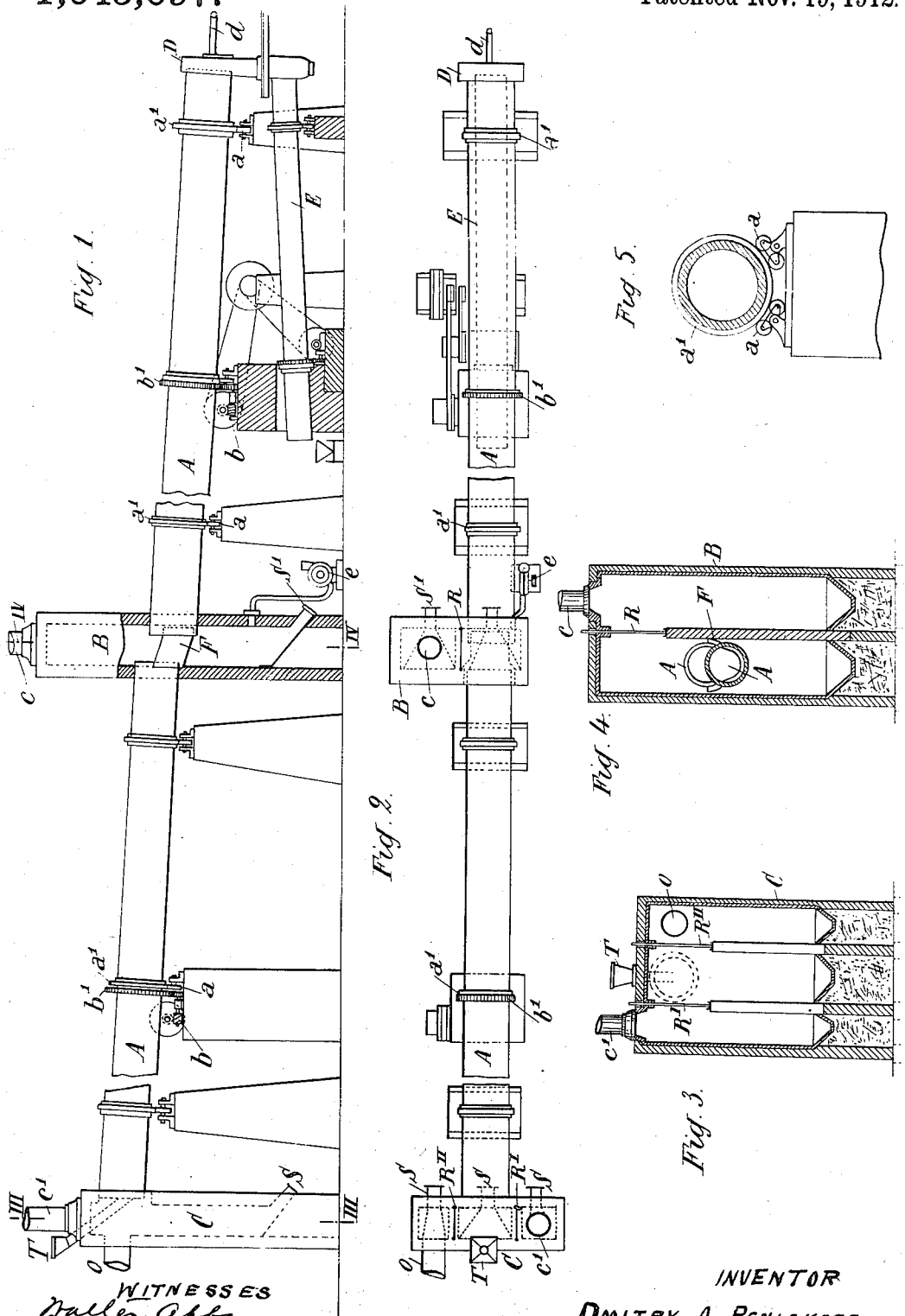

DMITRY ALEXANDROWITCH PENIAKOFF, OF BRUSSELS, BELGIUM.

MANUFACTURE OF ALKALI ALUMINATES.

1,045,097. Specification of Letters Patent. Patented Nov. 19, 1912.

Application filed January 29, 1910. Serial No. 540,385.

*To all whom it may concern:*

Be it known that I, DMITRY ALEXANDROWITCH PENIAKOFF, a subject of the Emperor of Russia, and residing at Brussels, Belgium, have invented Improvements in and Relating to the Manufacture of Alkali Aluminates, of which the following is a specification.

This invention has reference to a continuous method of manufacturing alkali aluminates.

When a mixture of alumina ($Al_2O_3$), and an alkani chlorid (NaCl) for example, is calcined without access of moisture or oxygen (air), no trace of formation of (sodium) aluminate, which is a combination of the two oxids, thus:—

$$2AlNaO_2 = Al_2O_3 + Na_2O,$$

can be discovered. On the contrary, when a mixture of, say common salt (NaCl), is calcined in a closed vessel with hydrate of alumina (or its mineral), traces of more highly oxidized alkali compounds can sometimes be found in the calcined product and therefore traces of aluminate also; the reason being that consequent upon the temperature, vapor of water is given off by the hydrate of alumina and causes partial decomposition of the chlorid according to the following equation:—

$$2NaCl + H_2O = Na_2O + 2HCL. \quad (I).$$

Unfortunately, however, the hydrate of alumina (or its mineral), during calcination loses successively the major part of its water of hydration at temperatures considerably lower than those at which the reaction (I) can take place, so that only the last traces of combined water come off at a temperature sufficiently high to permit of the occurrence of its oxidizing action upon the salt according to equation (I) and formation of the small quantity of aluminate hereinbefore mentioned.

According to the present invention, continuous manufacture of alkali aluminate is obtained, in the following way:—A mixture of salt and ferruginous bauxite (red bauxite) to which has been added a little carbon or other reducing agent is submitted to gradually insreasing heat under the combined action of a mixture of water vapor, sulfurous acid and air or even sulfurous acid and air only. The evolution of the chlorin then takes place very energetically and rapidly, and, in fact, commences at a temperature scarcely reaching a dull red heat. The chlorin in this operation is evolved either in the free state or as hydrochloric acid depending upon whether water vapor is present or not and on the proportion in which it may be present. Exactly the same effect can be obtained by replacing the sulfurous acid gas by the addition to the mixture of salt and bauxite of any substance which is capable of yielding this gas under the action of heat; such is the case with certain metallic sulfids or sulfates, as for example sulfid or sulfate of iron. If, as the evolution of chlorin proceeds under one condition or the other, the substance to be treated be moved successively into zones of the furnace which are hotter and hotter, so that it ultimately attains a bright red heat, there will be formed successively quantities of aluminate of soda with corresponding increase in richness of the substance until there remains no more chlorid or other undecomposed intermediate salts, when the mass can be discharged. The principal characteristic of this method of manufacture consists in the fact that as the operation is conducted in a continuous manner, it is possible, as soon as the reaction of the formation of aluminate has been well started, to stop all admission to the apparatus of sulfurous acid or of the substances which result in the formation thereof and to continue for a long time and uninterruptedly the manufacture of aluminate by simply feeding the apparatus with the mixture of bauxite and salt and reducing agent, on the one hand, and by the admission of air on the other.

Among the phenomena which this new method of manufacture exhibits there may be mentioned the following chemical reactions which appear to constitute the main features of it:—

First and foremost, the sulfurous acid admitted to the apparatus, combines in the presence of the oxygen of the air with the oxid of iron contained in the ferruginous bauxite, thus forming in the less heated zones of the apparatus sulfate of iron according to the following equation:—

$$Fe_2O_3 + 2SO_2 + O = 2FeSO_4. \quad (II).$$

As soon as it is formed, this sulfate of iron enters into double decomposition with the alkali chlorid present to form chlorid of iron and sulfate of soda according to the following equation:—

$$FeSO_4 + 2NaCl = Na_2SO_4 + FeCl_2. \quad (III).$$

The chlorid of iron, however, is in its turn decomposed as soon as it is formed, by the sulfurous acid present, to form sulfate of iron again and give up the chlorin, either in the free state or in the form of hydrochloric acid according to the following equation:—

$$FeCl_2 + SO_2 + O_2 = FeSO_4 + 2Cl. \quad (IV),$$

or $$FeCl_2 + SO_2 + H_2O + O = FeSO_4 + 2HCl. \quad (V)$$

This reformed sulfate of iron is again available for reaction III in which it transforms the alkali chlorid into sulfate. The chlorid of iron being easily volatile contributes in a very powerful way to the complete retention of the sulfurous acid gas without allowing it to escape from the apparatus; this is the reason that only chlorin and hydrochloric acid escape from the apparatus at the last. The mixture of raw materials thus transformed in the course of their journey descends gradually into the hotter parts of the apparatus to finally reach the zones heated to a brighter and brighter red, where the reaction of the formation of aluminate between the alumina contained in the bauxite and the sulfate of soda freshly formed takes place in the presence of the reducing agents added at the outset and according to the following equation:—

$$2Al_2O_3 + 2Na_2SO_4 + C = \\ 4AlNaO_2 + 2SO_2 + CO_2. \quad (VI),$$

or—

$$7Al_2O_3 + 7Na_2SO_4 + 2FeS = \\ 14AlNaO_2 + 9SO_2 + Fe_2O_3. \quad (VII).$$

The sulfurous acid is therefore here set free again to return with the gaseous current to again produce its action according to the cycle explained by equations II to V upon the fresh material which continually descends in the reverse direction to that followed by the gases. There thus results a cycle of chemical reactions wherein a single and the same quantity of sulfurous acid can indefinitely and continually convert considerable quantities of alkali chlorid mixed with bauxite into alkali aluminate and wherein only accidental losses of gas have to be replaced either by the introduction directly of a fresh quantity of $SO_2$, or by the introduction into the mixture of a sulfid or a sulfate and that in negligible quantities in comparison with the great total quantity of alkali chlorid operated upon; furthermore, if we consider the manufacture in course of working it will be seen that the raw materials employed and charged into the apparatus are solely bauxite and chlorid and reducing agents, and that the two products obtained are on the one hand aluminate of soda and on the other hand HCl or chlorin as the case may be.

It results from the preceding formulæ that the mixture to be introduced into the apparatus when in full operation should contain 2NaCl for each $Al_2O_3$ contained in the bauxite treated and in addition a quantity of the reducing agent sufficient to provide one molecule of oxygen (O) for each molecule of $Na_2SO_4$ formed in the course of the operation.

The improved method of manufacture can be carried out industrially by the aid of apparatus such as shown in the accompanying drawing, in which—

Figure 1 shows in sectional elevation one arrangement of apparatus suitable for the improved method of manufacture; Fig. 2 is a plan; Figs. 3 and 4 are sections on the lines 3—3 and 4—4, Fig. 1; Fig. 5 is a detail view.

The apparatus shown consists of one or more long tubes A, the axes of which are slightly inclined. These tubes which are made of iron and lined internally with a refractory coating are each placed upon a sufficient number of movable rollers $a$ worked by means of steel rings $a^1$ forming a rolling track (Fig. 5). A toothed circular pinion $b^1$ fixed near the middle of the length of each tube enables the tube to be slowly rotated by means of a gear wheel $b$. These tubes are in other respects of a common construction and are already employed as revolving furnaces in some industries, as for example in the cement industry. The lower end of each tube and the upper one of that placed immediately below it open into a fixed chamber B which places the tubes in communication with each other both for the passage of the ascending gases and the solid material passing from one into the other over the fixed inclined guide chute F. The upper end of the highest tube is surrounded by a fixed head C furnishing on the one hand an outlet to the gases escaping from the apparatus and on the other hand an inlet for the materials to be charged into the same. The lowest end of the bottom tube is likewise surrounded by a fixed hood D, furnishing on the one hand, means for introducing the combustible and it may be the gases necessary to the reaction, and on the other hand, providing an outlet for the solid products issuing from the apparatus. The heating of this apparatus is effected either by the gases coming from a gas generator and fed into the apparatus by a pipe $d$ passing into the fixed head D at the bottom, or by blowing in finely powdered coal, or by blowing in a liquid combustible by means of a jet of steam or compressed air. The chamber B comprises two compartments separated by a partition having at its upper end an opening controlled by a plate valve R. One of these compartments is in communication with the atmosphere through a chimney $c$. The head C comprises three compartments separated from each other by partitions each having an opening at the upper part, such openings being controlled by plate valves $R^1$ and $R^{11}$ respectively. The upper cylinder A communicates with the central compartment. One of the side compartments is in communication with gas condensing apparatus through a conduit O, and the compartment at the other side is in communication with a chimney $c^1$. $e$ is a fan for supplying air to the upper tube A. The working of this apparatus is easy to understand. The combustible introduced at the lower end D of the apparatus ascends through tubes A to gradually heat all their parts to different degrees; the hottest zones are thus located in the vicinity of the part where the most intense combustion takes place and the less and less hot zones ascend gradually toward the upper end. The material is charged into the upper tube A at T and passes from that tube into the second tube A by means of the fixed chute F. From the second tube the material then passes into the cooler E from which it is taken away in trucks. The gases take the opposite path.

At the moment of lighting the valve R is opened to allow the gases of combustion to escape to the atmosphere through the chimney $c$. When the heating operation is well under way, the valve R is closed, the valve $R^1$ opened and the valve $R^{11}$ closed, and the gases escape through the chimney $c^1$. When the furnace tubes A have attained the desired temperature the valves R and $R^1$ are closed and the valve $R^{11}$ opened, and the operation of charging is started under these conditions. The acid gases pass to the condensing apparatus through the conduit O. The dust escaping from the tubes, entrained by the gases or otherwise, falls into the dust chambers B and C and is collected at S and $S^1$. The material treated issues from the apparatus completely converted into aluminate. The cooler E is constituted by a revolving and inclined tube of smaller dimensions than the tubes A and in which the material descends in contact with the hot air, which serves for the combustion and the reaction in the upper tubes A. The material treated and cooled then falls directly into trucks as before stated or is delivered into a shaking trough to be transported to its storage depot.

Having thus arranged the apparatus, the next thing is to prepare the material to be charged thereto, first with a view at starting to initiate the reaction and form in the apparatus the necessary reserve of sulfurous acid, and then, secondly with a view to the continuous manufacture when the reaction of the formation of aluminate is initiated. To this end and for the purpose of realizing the first phase, the first charges to be introduced into the apparatus already previously heated should consist preferably of an intimate mixture of bauxite and salt (alkali chlorid) to which has been added a reducing agent and any sulfurous product such as sulfid or sulfate of iron, the whole being finely ground, or bauxite and sulfate of soda with addition of carbon or sulfid of iron, according to formulæ VI and VII. The first charges should naturally contain the whole of the sulfur necessary to displace the whole of the chlorin contained in the salt present. This addition of quantities of sulfurous products should be afterward gradually diminished in the mixture of raw materials and finally suppressed altogether, as soon as the reaction of formation of aluminate is well started. The second phase, namely, the continuous manufacture, must then be considered. In this phase the material to be charged in should consist principally of only an intimate and pulverized mixture of bauxite and salt, and the necessary reducing agent.

It should be noted that in the case where metallic sulfid is used as reducing agent, there is formed an additional quantity of $SO_2$, which compensates for the accidental losses of sulfurous acid which may be produced during manufacture. Generally when the raw materials are not specially submitted to dehydration, they contain enough combined water to bring about the reaction according to equation V given above, that is to say, with the exclusive formation of hydrochloric acid. Consequently if it be desired to conduct the operation according to equation IV., that is to say, with the formation of chlorin instead of hydrochloric acid, it will be necessary of course to previously dehydrate the raw materials to be charged in, and even dry, if necessary, the air necessary to the reaction and combustion.

As regards the oxygen necessary to the whole of the operation, it will be in great part supplied in the excess of air admitted for the purpose of combustion; the remarkable peculiarity should however be noted that whatever the reasonable excess of air admitted for the purpose of combustion may be, not the least trace of free oxygen will be found at the outlet from the lowest tube, that is to say, at the entrance of the tube immediately above it; this is explained by the fact that the total quantity of oxygen contained in the excess of air admitted for the purpose of combustion is already absorbed in the first tube to complete the reactions above indicated and it will therefore be necessary to admit, in order to complete the reactions, a supplementary quantity of air at the point where the gases pass from the lower tube to the tube immediately above it. Given this arrangement of the apparatus and the rapidity of the reaction which is carried out therein, a very large production with the minimum of fuel is obtained; the result therefore is that the gases issuing from the apparatus notwithstanding that they contain all the gaseous products of the combustion are still sufficiently rich in gaseous hydrochloric acid to afterward permit of a normal and rational condensation of this gas. In reality these gases are richer in HCl than those which are habitually evolved from the calcined product of the ordinary sulfate of soda furnaces and they are almost at the same temperature. For the purpose of this condensation of the HCl the gases issuing from the above apparatus are directed first into dust chambers or filters and afterward into condensing apparatus formed preferably by large towers and basins of volcanic lava or other stone incapable of being attacked by acid and leaving sufficient free apertures for the passage of the gases.

I claim as my invention,

1. A continuous process for making alkali aluminates, which consists in subjecting a mixture of alumino-ferrous minerals, alkali chlorids and a reducing agent, to progressive calcination under gradually increasing heat in an atmosphere containing sulfurous acid and oxygen, substantially as and for the purpose described.

2. A continuous process for making alkali aluminates, which consists in subjecting a mixture of alumino-ferrous minerals, alkali chlorids and a reducing agent, to progressive calcination under gradually increasing heat in an atmosphere containing sulfurous acid, oxygen and water vapor, substantially as and for the purpose described.

Signed at Brussels (Belgium) this 10th day of January 1910.

DMITRY ALEXANDROWITCH PENIAKOFF.

Witnesses:
C. HEIRMON,
G. GOUPOR.